(12) United States Patent
Nakanishi et al.

(10) Patent No.: US 10,742,830 B2
(45) Date of Patent: Aug. 11, 2020

(54) BOOK DIGITIZATION APPARATUS AND BOOK DIGITIZATION METHOD

(71) Applicant: SHARP KABUSHIKI KAISHA, Sakai, Osaka (JP)

(72) Inventors: Tohru Nakanishi, Sakai (JP); Zenken Kin, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/445,715

(22) Filed: Jun. 19, 2019

(65) Prior Publication Data

US 2019/0394346 A1    Dec. 26, 2019

(30) Foreign Application Priority Data

Jun. 25, 2018    (JP) .................. 2018-119948

(51) Int. Cl.
| | | |
|---|---|---|
| H04N 1/00 | (2006.01) | |
| H04N 1/028 | (2006.01) | |

(52) U.S. Cl.
CPC ..... *H04N 1/00827* (2013.01); *H04N 1/02815* (2013.01)

(58) Field of Classification Search
CPC ........... G06K 2009/363; G06K 9/3283; H04N 1/387; H04N 1/19594; H04N 2201/0081; H04N 2201/0096; H04N 2201/0434; G06F 21/32; G06F 3/167; G09B 5/06; G10L 15/22; G10L 17/24; G10L 2015/223
USPC ................................ 358/498, 474
See application file for complete search history.

(56) References Cited

U.S. PATENT DOCUMENTS

| | | | | |
|---|---|---|---|---|
| 4,658,978 A * | 4/1987 | Ikematsu | ............... | F16K 27/067 137/316 |
| 6,283,380 B1 * | 9/2001 | Nakanishi | .......... | G05D 23/1917 236/49.3 |
| 6,426,748 B1 * | 7/2002 | Megahed | ................. | G06K 9/48 345/419 |
| 6,560,645 B1 * | 5/2003 | Igawa | .................... | G06Q 10/08 709/203 |
| 6,648,530 B2 * | 11/2003 | Kamei | .................. | G06F 1/1616 341/22 |
| 7,495,346 B2 * | 2/2009 | Nakanishi | ............... | H01L 23/16 257/796 |
| 8,687,916 B2 * | 4/2014 | Kluzner | ............... | G06K 9/3283 382/275 |
| 8,885,233 B2 * | 11/2014 | Shen | .................. | H04N 1/19594 358/471 |
| 9,588,651 B1 * | 3/2017 | Buchanan | ............. | G06F 3/0483 |
| 10,384,075 B2 * | 8/2019 | Iguchi | .................. | A61N 5/0616 |
| 10,463,875 B2 * | 11/2019 | Iguchi | .................... | A61N 5/062 |

(Continued)

FOREIGN PATENT DOCUMENTS

WO    2017/131184 A1    8/2017

*Primary Examiner* — Negussie Worku
(74) *Attorney, Agent, or Firm* — ScienBiziP, P.C.

(57) ABSTRACT

A book digitization apparatus includes: a table capable of storing a type of paper and a physical property of an energy ray, which the paper is able to absorb, in association with each other; an acquisition unit that acquires, from the table, a physical property of an energy ray, which corresponds to a type of paper that is input; and an image capturing unit that acquires three-dimensional data of a book by capturing an image of the book with an energy ray having the acquired physical property.

7 Claims, 5 Drawing Sheets

(56) References Cited

U.S. PATENT DOCUMENTS

| | | | |
|---|---|---|---|
| 10,496,904 B2* | 12/2019 | Nakanishi | G06F 3/0483 |
| 2011/0299775 A1* | 12/2011 | Kluzner | G06K 9/3283 |
| | | | 382/173 |
| 2013/0077138 A1* | 3/2013 | Shen | H04N 1/19594 |
| | | | 358/498 |
| 2013/0183651 A1* | 7/2013 | Takahashi | G09B 5/06 |
| | | | 434/350 |
| 2015/0344711 A1* | 12/2015 | Shimono | C09D 11/38 |
| | | | 428/207 |
| 2016/0027183 A1* | 1/2016 | Ohi | H04N 1/6005 |
| | | | 348/207.1 |
| 2017/0339293 A1* | 11/2017 | Nimura | H04N 1/38 |
| 2018/0322372 A1 | 11/2018 | Nakanishi et al. | |
| 2019/0172468 A1* | 6/2019 | Jain | G06F 21/32 |
| 2019/0258906 A1* | 8/2019 | Nakanishi | G06K 9/344 |

* cited by examiner

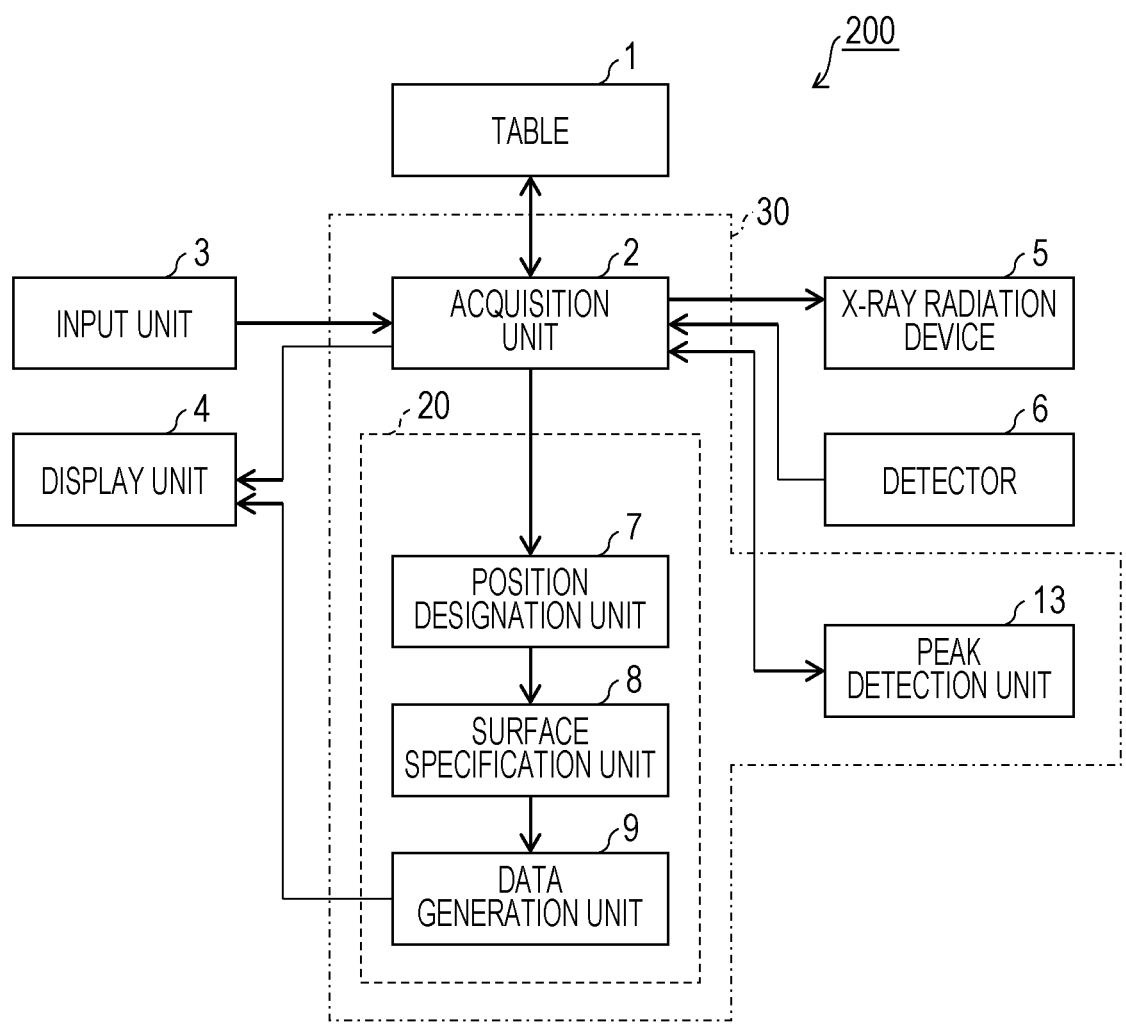

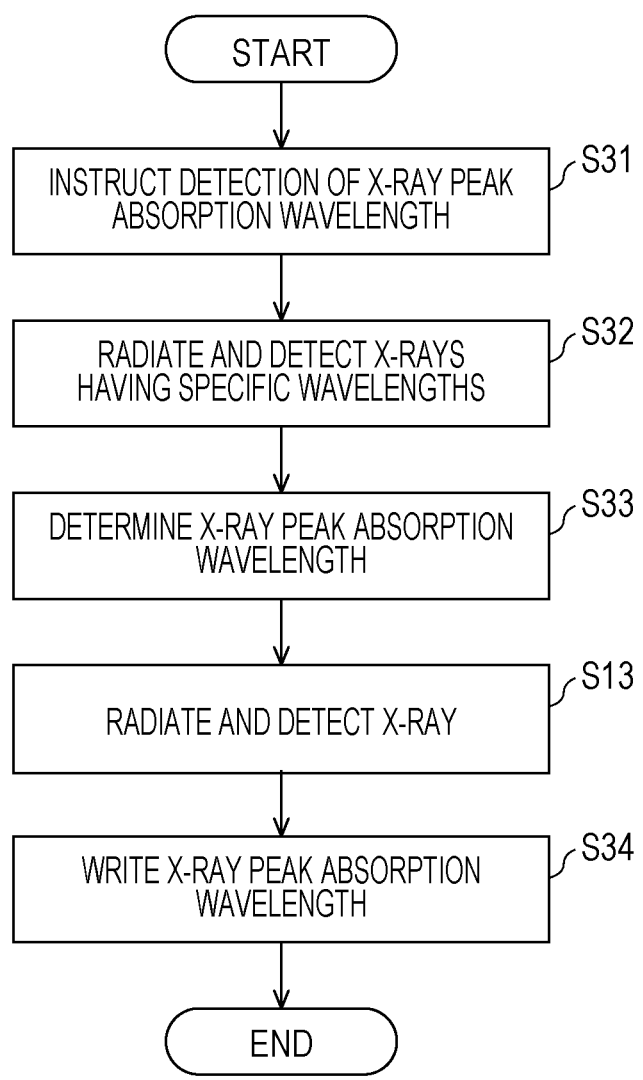

BOOK DIGITIZATION APPARATUS AND BOOK DIGITIZATION METHOD

BACKGROUND

1. Field

The present disclosure relates to a book digitization apparatus and a book digitization method.

2. Description of the Related Art

From a viewpoint of preservation or utilization of a book, it is desired that a book is converted into digitized data. Since a book may be damaged when being opened, it is desired that the book is able to be converted into digitized data without being opened.

As a technology of such conversion into digitized data, a technology has been known by which three-dimensional data of a book, which is acquired by X-ray radiation, is used to specify a page region corresponding to a page of the book and a character string or a graphic in the page region is mapped to a two-dimensional plane (for example, refer to International Publication No. WO2017/131184). The three-dimensional data is a set of points which are also called nodes and each of which has information of a detection position of an X-ray and absorption intensity of the X-ray.

According to the aforementioned technology, two-dimensional page data including a character string or a graphic written or drawn in the book is created. Each two-dimensional page data is constituted by some of the nodes which are arranged on a predetermined plane.

In the related art as described above, when three-dimensional data is converted into two-dimensional page data, all node data including a node of paper and a node of ink on the two-dimensional plane is subjected to conversion processing. Thus, there is a problem, for example, of increased time to perform the processing.

It is desirable to achieve conversion of a book into digitized data, which is able to be performed in a reduced time.

SUMMARY

To cope with the aforementioned problem, a book digitization apparatus according to an aspect of the disclosure includes: a table capable of storing a type of paper and a physical property of an energy ray, which the paper is able to absorb, in association with each other; an acquisition unit that acquires, from the table, a physical property of an energy ray, which corresponds to a type of paper that is input; and an image capturing unit that acquires three-dimensional data of a book by capturing an image of the book with an energy ray having the acquired physical property.

BRIEF DESCRIPTION OF THE DRAWINGS

FIG. 6 is a block diagram of a book digitization apparatus according to Embodiment 2 of the disclosure; and FIG. 7 is a flowchart of the book digitization apparatus according to Embodiment 2 of the disclosure creating three-dimensional data of a book.

DESCRIPTION OF THE EMBODIMENTS

Embodiment 1

Hereinafter, an embodiment of the disclosure will be described in detail.

[Schematic Configuration of Book Digitization Apparatus]

Figure 1:
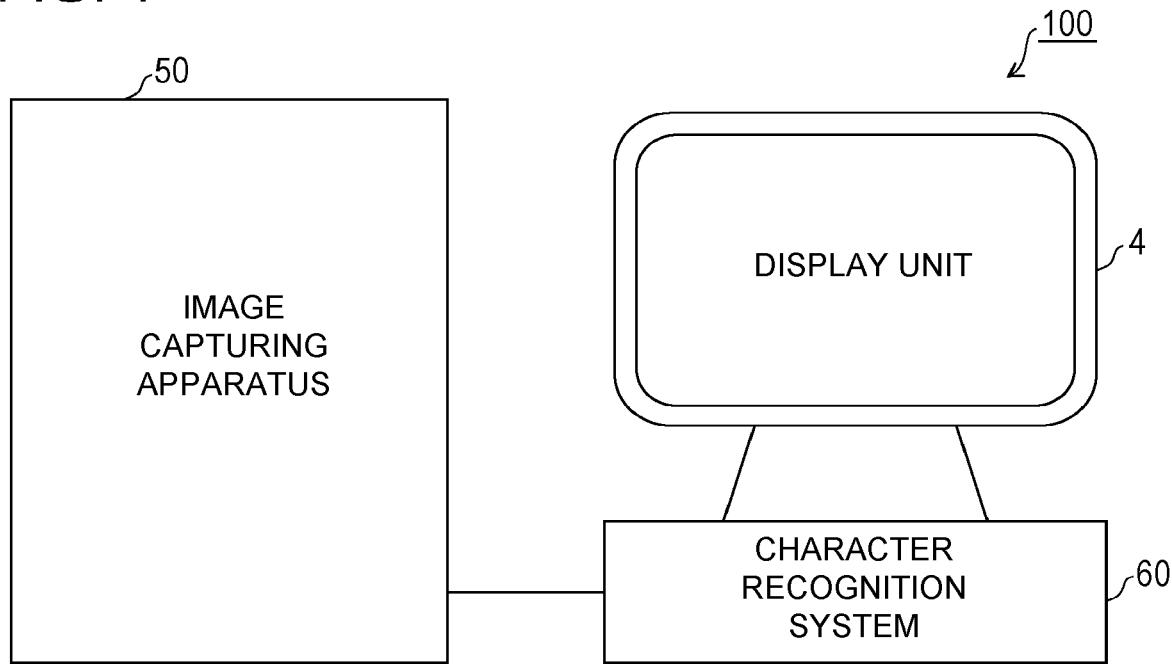
FIG. 1 is a view schematically illustrating a configuration of a book digitization apparatus according to Embodiment 1 of the disclosure.
Figure 2:
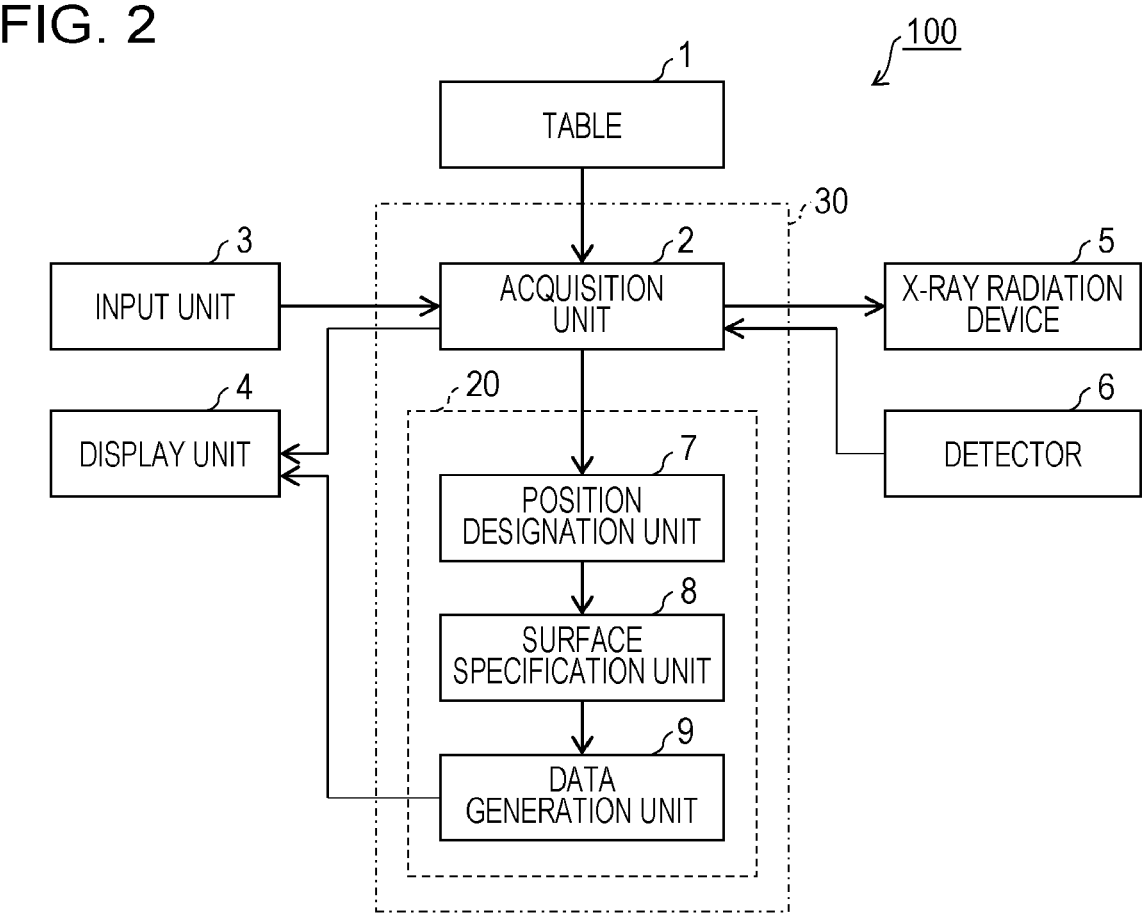
FIG. 2 is a block diagram of the book digitization apparatus according to Embodiment 1 of the disclosure.

FIG. 1 is a view schematically illustrating a configuration of a book digitization apparatus 100 according to Embodiment 1 of the disclosure. FIG. 2 is a block diagram of the book digitization apparatus 100. As illustrated in FIG. 1, the book digitization apparatus 100 has an image capturing apparatus 50, a display unit 4, and a character recognition system 60. Moreover, as illustrated in FIG. 2, the book digitization apparatus 100 includes a table 1, an acquisition unit 2, an input unit 3, the display unit 4, an X-ray radiation device 5, a detector 6, a position designation unit 7, a surface specification unit 8, and a data generation unit 9. In FIG. 2, a reference sign 20 indicates a data creating unit and a reference sign 30 indicates a control block.

The display unit 4 displays information about an operation of the book digitization apparatus 100, such as input information from the input unit 3 in the image capturing apparatus 50, a detection result of the detector 6, or two-dimensional data created by the data generation unit 9. The display unit 4 is, for example, a liquid crystal display device.

The character recognition system 60 is a system capable of recognizing a character from two-dimensional page data that is input. The character recognition system 60 is constituted by, for example, a data processing device that is connected to the Internet. The character recognition system 60 is able to be constructed by, for example, a personal computer (PC) having sufficient processing capability.

The image capturing apparatus 50 is configured so as to irradiate a book with an X-ray, which is an energy ray, detect the X-ray, and perform a sequence of data processing related thereto.

In the book digitization apparatus 100, the display unit 4 and the character recognition system 60 are integrally configured. On the other hand, the image capturing apparatus 50 is connected to the display unit 4 and the character recognition system 60 so as to allow data communication, and connected to the character recognition system 60 as illustrated in FIG. 1, for example. The table 1, the acquisition unit 2, the input unit 3, the position designation unit 7, the surface specification unit 8, and the data generation unit 9 are included in the character recognition system 60 of FIG. 1. The X-ray radiation device 5 and the detector 6 are included in the image capturing apparatus 50 of FIG. 1.

The table 1 stores a type of paper, and a tube voltage and a peak absorption wavelength of the X-ray corresponding to the paper, in association with each other. For example, as illustrated in TABLE 1, the table 1 stores, as physical properties of the X-ray, the tube voltage and the peak absorption wavelength of the X-ray in association with a print sheet (fine quality paper), a print sheet (recycled paper), postcard paper, a newspaper, and tracing paper. A range of the tube voltage in the table 1 indicates a range of the tube voltage of the X-ray, by which corresponding paper is most recognizable. A range of the peak absorption wavelength in the table 1 indicates a range where a peak of a wavelength of the X-ray which is absorbed by the corresponding paper may be included.

The type of the paper is easily distinguished by appearance and is thus able to be specified. The X-ray peak absorption wavelength (a peak value of an absorption wavelength) which corresponds to the type of the ink is able to be specified by irradiating the paper in a printed matter with X-rays having various wavelengths. Fluctuation of a detection value, for example, such as slight shift due to a difference in intensity of the X-rays, may be taken into consideration for the peak absorption wavelength. The peak absorption wavelength may be a representative value thereof, a range as described in TABLE 1, or a median of the range.

TABLE 1

| Paper type | Tube voltage (kV) | Wavelength (nm) |
| --- | --- | --- |
| Print sheet (fine quality paper) | 30 to 50 | 0.025 to 0.041 |
| Print sheet (recycled paper) | 40 to 60 | 0.020 to 0.031 |
| Postcard paper | 5 to 10 | 0.124 to 0.284 |
| Newspaper | 80 to 90 | 0.013 to 0.016 |
| Tracing paper | 70 to 80 | 0.016 to 0.017 |

The acquisition unit 2 acquires an input signal, such as an input signal from a user, from the input unit 3. The acquisition unit 2 also acquires, from the table 1, a tube voltage or a peak absorption wavelength of the X-ray, which corresponds to a paper type that is input by the user. Furthermore, the acquisition unit 2 acquires three-dimensional data of a book by detection values of the detector 6 described below. On the other hand, the acquisition unit 2 outputs the tube voltage or the peak absorption wavelength of the X-ray, which is acquired from the table 1, to the X-ray radiation device 5. The acquisition unit 2 also outputs information, such as the three-dimensional data from the detector 6, which is acquired by the acquisition unit 2 to the display unit 4 or the position designation unit 7 as appropriate.

The input unit 3 is a device through which an instruction to the acquisition unit 2 is input. The input unit 3 may be, for example, a hardware keyboard or a software keyboard.

The display unit 4 displays information about the book digitization apparatus 100, such as input information from the input unit 3, a detection result of the detector 6 described below, resultant three-dimensional data of a book, or two-dimensional data created by the data generation unit 9.

The X-ray radiation device 5 irradiates a book with an X-ray. The X-ray radiation device 5 is configured to enable the output (wavelength) of X-ray radiation to be adjusted, for example, and is able to irradiate the book with an X-ray having a desired wavelength.

The detector 6 detects the X-ray radiated onto the book. The detector 6 is configured so as to acquire a detection value including a detection position of the X-ray and intensity of the X-ray at the position. The detector 6 outputs the acquired detection value to the acquisition unit 2 as three-dimensional data.

In this manner, the X-ray radiation device 5, the detector 6, and the acquisition unit 2 constitute an image capturing unit that acquires the three-dimensional data of the book by capturing an image of the book with the X-ray having the tube voltage or the peak absorption wavelength.

The position designation unit 7 designates an initial point for specifying a page region in accordance with data values of the three-dimensional data. The page region is a part corresponding to each page of the book in the three-dimensional data, and is a set of nodes that exist on a certain surface corresponding to the page. The position designation unit 7 outputs information of the initial point to the surface specification unit 8.

The surface specification unit 8 specifies a page region connected to the designated initial point. The surface specification unit 8 outputs, to the data generation unit 9, a set of points corresponding to the page region and data values of the respective points.

The data generation unit 9 converts data of the specified page region into two-dimensional (planar) page data. The page data has information about a positional relation of a plurality of characters or graphics (arrangement of the characters or the like) in a page of the book.

In this manner, the position designation unit 7, the surface specification unit 8, and the data generation unit 9 constitute a data creating unit 20 that creates two-dimensional data of the book from the three-dimensional data of the book.

[Book Digitization Method]

Hereinafter, a book digitization method according to an embodiment of the disclosure will be described. A book digitization method according to Embodiment 1 includes a step of acquiring a tube voltage or a peak absorption wavelength of an X-ray, which corresponds to a paper type that is input by a user, and a step of acquiring three-dimensional data of a book. In the book digitization method, the tube voltage or the peak absorption wavelength of the X-ray is acquired from the table 1. The three-dimensional data is acquired by capturing an image of the book with the X-ray having the tube voltage or the peak absorption wavelength that is acquired from the table 1.

Figure 3:
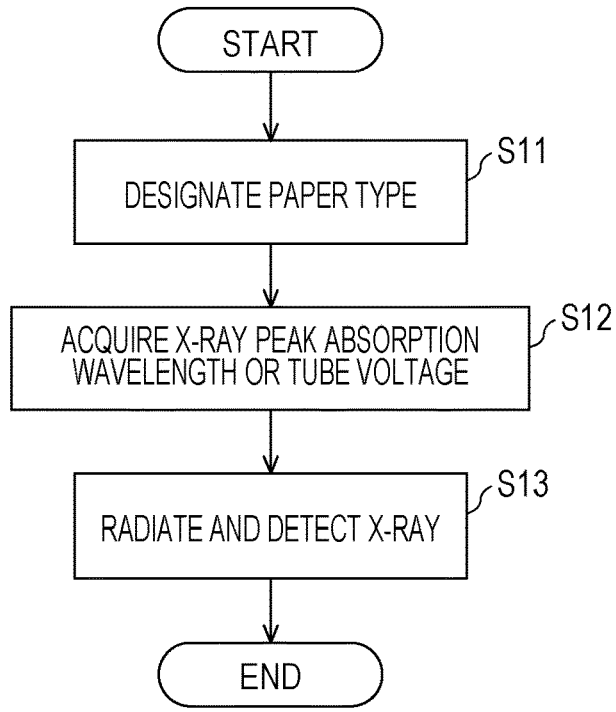
FIG. 3 is a flowchart of the book digitization apparatus according to Embodiment 1 of the disclosure creating three-dimensional data of a book.

The book digitization method is able to be executed by using the book digitization apparatus of the present embodiment described above. FIG. 3 is a flowchart of the book digitization apparatus according to Embodiment 1 of the disclosure creating three-dimensional data of a book.

First, a paper type of a book to be digitized is designated through the input unit 3 (step S11). The paper type is input to the input unit 3, for example, by a user. The input unit 3 provides the acquisition unit 2 with information of the designated paper type.

The acquisition unit 2 acquires, from the table 1, a tube voltage or a peak absorption wavelength of the X-ray, which corresponds to the designated paper type (step S12). In this manner, the X-ray peak absorption wavelength corresponding to the paper type that is input by the user is acquired from the table 1 that stores types of paper and tube voltages and peak absorption wavelengths of the X-ray according to the paper in association with each other. The tube voltage or the peak absorption wavelength is immediately acquired upon designation of the paper type.

For example, in a case where the book includes a print sheet (fine quality paper), the user inputs "print sheet (fine quality paper)" to the input unit 3. The acquisition unit 2 to which information of "print sheet (fine quality paper)" is provided from the input unit 3 acquires a tube voltage of the X-ray of 30 to 50 kV, which corresponds to the print sheet (fine quality paper), from the table 1 as the tube voltage of the X-ray to be radiated onto the book. In this case, the acquisition unit 2 selects, for example, a median (40 kV) in the range as the tube voltage of the X-ray to be radiated. Alternatively, the acquisition unit 2 acquires a wavelength of the X-ray of 0.025 to 0.041 nm, which corresponds to the print sheet (fine quality paper), from the table 1 as the wavelength of the X-ray to be radiated onto the book. In this case, the acquisition unit 2 selects, for example, a median (0.033 nm) in the range as the wavelength of the X-ray to be radiated.

Next, the acquisition unit 2 causes the X-ray radiation device 5 to irradiate the book with an X-ray, which has the tube voltage or the peak absorption wavelength that is acquired, and causes the detector 6 to detect the X-ray (step S13). The X-ray radiation device 5 irradiates the book with the X-ray in a closed state. Part of the X-ray from the X-ray radiation device 5 is absorbed by the paper in the book.

The detector 6 detects the X-ray that has passed through the book, acquires detection values including specific positions and intensity of the X-ray, and provides the detection values to the acquisition unit 2. The detector 6 detects the X-ray, which has passed through a region of paper in the book, as an X-ray having intensity higher than that of the X-ray that has passed through a region of paper, to which ink is attached, in the book. A set of the detection values constitutes three-dimensional data including a point where the X-ray having such high intensity is detected. The three-dimensional data includes information about positions of the ink and a sheet surface and information about intensity of the X-ray at the positions and thus indicates a position of one page in the book, and the acquisition unit 2 acquires such three-dimensional data. In this manner, by capturing the image of the book with the X-ray having the tube voltage or the peak absorption wavelength that is acquired from the table 1, the three-dimensional data of one page in the book is acquired. The acquisition unit 2 provides the three-dimensional data to the position designation unit 7.

Figure 4:
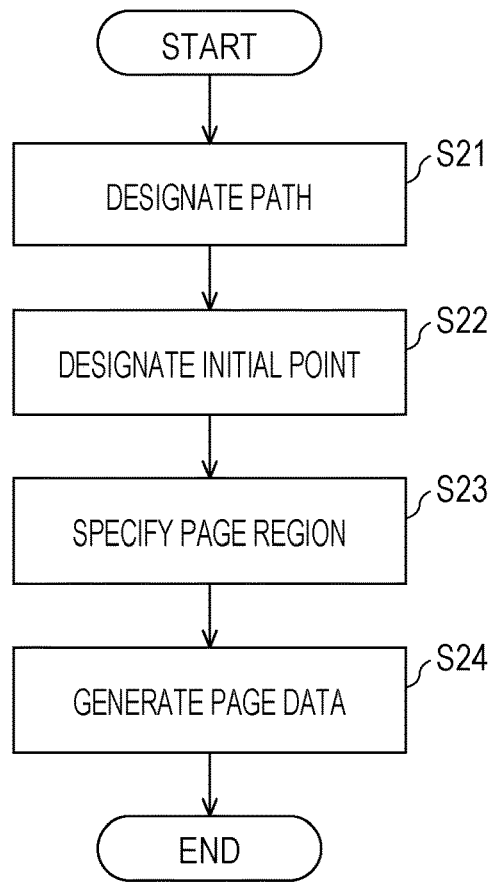
FIG. 4 is a flowchart of the book digitization apparatus according to Embodiment 1 of the disclosure creating two-dimensional data from the three-dimensional data of the book.

FIG. 4 is a flowchart of the book digitization apparatus according to Embodiment 1 creating two-dimensional data from the three-dimensional data of the book. The three-dimensional data includes, as detection positions of the X-ray and intensity thereof, information about a plurality of sheets (media, for example, paper) that are overlapped, a gap (air) between sheets, and ink (character) on a sheet. The creation of the two-dimensional data from the three-dimensional data is able to be performed by a known method as described in International Publication No. WO2017/131184, for example.

The position designation unit 7 designates, in the three-dimensional data, a linear path so that the linear path passes through at least one sheet (one page in a case where the book has multiple pages) of overlapping media (step S21). For example, in the case where the book has multiple pages, the path is a straight line that passes through the book from a front cover to a back cover and through all pages of the book.

The position designation unit 7 designates a point, which corresponds to a threshold for distinguishing a data value of a sheet and a data vale of a gap, in the path as an initial point of a page region (step S22). The position designation unit 7 designates, for example, a plurality of initial points corresponding to a plurality of page regions. The position designation unit 7 provides information of the initial point to the surface specification unit 8.

The surface specification unit 8 specifies a position of the page region that is determined in accordance with the initial point (step S23). For example, the page region is disposed, in orthogonal coordinates of the three-dimensional data, so as to cross a unit cell constituting the orthogonal coordinates. For example, the surface specification unit 8 sets points, which have the aforementioned threshold or greater on the sides of the unit cell traversed by the page region, as points corresponding to the page region, and specifies the page region. The surface specification unit 8 provides information of the specified page region to the data generation unit 9.

The data generation unit 9 maps data values of the respective points of the page region to a two-dimensional plane, thereby generating page data (step S24). The data values of the respective points of the two-dimensional page data roughly correspond to either a sheet or ink. A known method (for example, three-dimensional mesh deployment utilizing saddle point characteristics or the like) is usable as a mapping method.

[Character Recognition in Page Data]

Figure 5A:
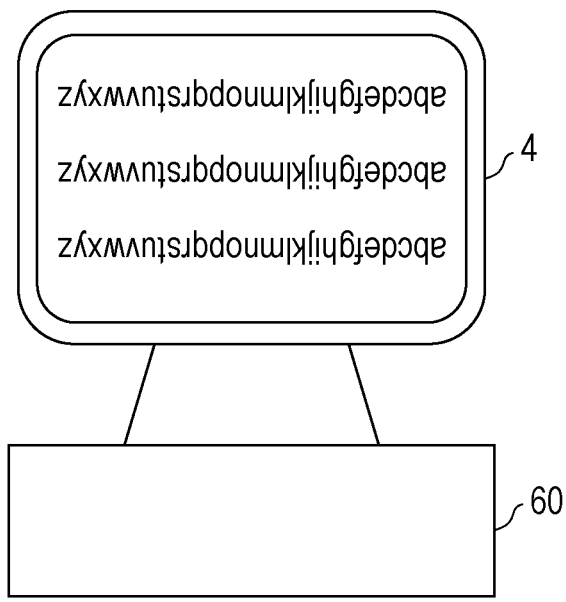
FIG. 5A is a view schematically illustrating a first state of character recognition from two-dimensional data by the book digitization apparatus according to Embodiment 1 of the disclosure and FIG. 5B is a view schematically illustrating a second state of the character recognition from the two-dimensional data by the book digitization apparatus according to Embodiment 1 of the disclosure.
Figure 5B:
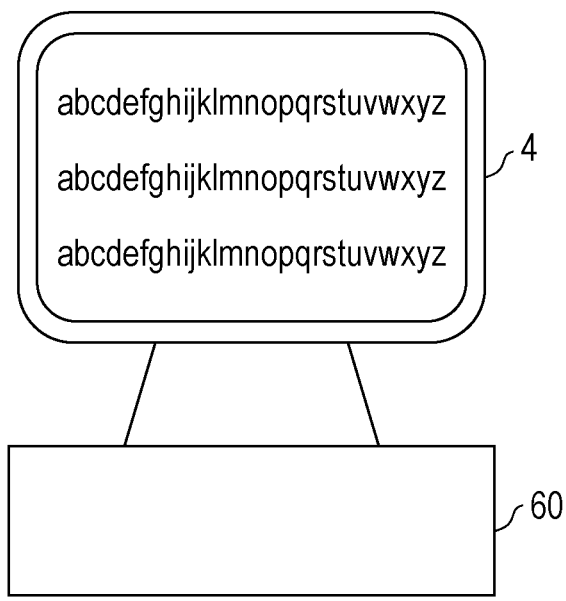

Hereinafter, character recognition of page data from two-dimensional data by the data generation unit 9 will be described. The two-dimensional data may be merely considered to be a set of nodes on a certain surface. When recognizing the set of the nodes as an appropriate character, the data generation unit 9 creates, from the two-dimensional data, data that is able to be displayed as the character in a suitable form. FIG. 5A is a view schematically illustrating a first state of character recognition from two-dimensional data by the book digitization apparatus 100 according to Embodiment 1. FIG. 5B is a view schematically illustrating a second state of the character recognition from the two-dimensional data by the book digitization apparatus 100.

The character recognition system 60 receives two-dimensional data (page data) from the image capturing apparatus 50 (for example, data generation unit 9) and displays, on the display unit 4, data for any one page in the page data (FIG. 5A). In a case where the number of characters included in one page is small, subsequent character recognition processing may be difficult. From a viewpoint of achieving smooth character recognition, it is suitable that proportion of character data in one page is about 30% of an area of the one page.

A user confirms a screen, which is displayed, and rotates the screen of the character data as necessary (FIG. 5B).

Next, the user inputs, to the character recognition system 60, information about the character data that is displayed. Examples of the information include a direction of characters (horizontal writing, vertical writing, reading from the left, reading from the right, or the like), a type of the characters (alphabet, Arabic alphabet, Chinese character, or the like), and a language (English, French, Japanese, or the like). The character recognition system 60 refers to the information and determines a first character with which character recognition is to be started, a recognition direction, and a recognition method.

As described above, the page data has information about a positional relation of a plurality of characters or graphics (arrangement of the characters or the like) in a page of the book. The page data is generated on the basis of a page region that is accurately specified. Thus, even when there is noise in the page data, an image such as a character string in the page data is able to be accurately recognized. Accordingly, the book digitization apparatus 100 easily acquires information of a character string or a graphic written or drawn in the book from the page data. As a result, the book digitization apparatus 100 is able to read not only an isolated character, but also a word that is formed by a plurality of characters or a sentence that is formed by a plurality of such words, which is written in the book. The user is able to easily recognize the character string or the like in page data displayed on the display unit 4.

[Explanation about Reducing Imaging Time]

The book digitization apparatus 100 is able to reduce a time during which an image of a book is captured with an X-ray compared to a book digitization apparatus of the related art. A reason therefor will be described below.

An X-ray transmission image includes shade due to a difference in an absorbance of an X-ray. An X-ray is transmitted through wood or paper almost without being absorbed, but is transmitted through ink in the book with being absorbed compared with the case of wood or paper. Thus, to achieve image capturing of paper with use of the X-ray most easily, a wavelength or the like that allows absorption by the paper as much as possible is selected as a physical property. Therefore, a difference in an X-ray transmission amount is reflected to page data. The difference in the X-ray transmission amount between paper and ink is generally so large that sufficient contrast is obtained, and therefore, a character string in such page data is able to be accurately read out from the page data.

The absorbance of the X-ray by the paper is determined in accordance with a wavelength (intensity) of the X-ray and a material of the paper that is an object. In a case where the wavelength of the X-ray to be radiated is too long (intensity of the X-ray is too low), the difference in the absorbance of the X-ray between the ink and the paper is too small, so that the contrast may be insufficient. Conversely, in a case where the wavelength of the X-ray to be radiated is too short (intensity of the X-ray is too high), the X-ray is transmitted through not only the paper but also the ink, so that the contrast may be insufficient. Thus, the X-ray with the intensity (wavelength) in which the contrast between the ink and a medium (such as paper) in the book is sufficiently high is desired to be radiated. It is generally desirable that the X-ray with the tube voltage or the wavelength (peak absorption wavelength) that is difficult to be absorbed by the paper and is absorbed most by the ink is radiated, from a viewpoint of achieving sufficient contrast described above.

The highest absorbance of the X-ray by the paper enables to capture an image of a paper part most clearly. In this case, the tube voltage or the peak wavelength of the X-ray is set to a value by which the absorbance of the X-ray by the paper is highest.

The tube voltage or the wavelength of the X-ray in which sufficient contrast is obtained is able to be determined in accordance with a result (behavior) of the absorbance of the X-ray, which is obtained in a case where a wavelength of the X-ray to be radiated onto the paper or the book is gradually changed. Here, "the tube voltage or the wavelength of the X-ray in which sufficient contrast is obtained" is, for example, a peak of the wavelength of the X-ray that is absorbed by the paper, and the "case where the wavelength of the X-ray to be radiated onto the paper or the book is gradually changed" is, for example, a case where the intensity of the X-ray is gradually increased. However, it commonly takes time to change the intensity of the X-ray to be radiated. Accordingly, there is a tendency that it also takes time to convert a book into digitized data by radiating an X-ray and detecting the X-ray.

In Embodiment 1, a relation between a type of paper, and an absorbance in a tube voltage or a wavelength when the X-ray is radiated onto the paper (for example, a tube voltage or a peak absorption wavelength of the X-ray in which the absorbance is minimum) is examined in advance, and the type of the paper and the tube voltage or the peak absorption wavelength of the X-ray in the paper are stored in the table. For example, in a case where a book that is a target includes a print sheet (fine quality paper), the book digitization apparatus 100 selects, as an X-ray to be radiated, the X-ray having the tube voltage of 30 to 50 kV from the table, irradiates the book with the X-ray and detects the X-ray, and performs visualization of the book (acquires three-dimensional data). Thus, in the book digitization apparatus 100, the time taken to adjust the tube voltage or the wavelength of the X-ray to be radiated onto the book is reduced. As a result, the book digitization apparatus 100 is able to more quickly acquire the page data. Accordingly, the time taken to acquire digitized data of the book as a set of the page data is also further reduced.

In a case where information described in a book is converted into digitized data, when the book is an old document, for example, not only a method of extracting contents described in the book as character information but also a method of performing extraction as information of one piece of paper (one page) in a form of, for example, PDF data is used. The present embodiment is suitable for the latter method.

Embodiment 2

Another embodiment of the disclosure will be described below. Note that, for convenience of description, members having the same functions as those of the members described in the aforementioned embodiment will be given the same reference signs and description thereof will not be repeated. FIG. 6 is a block diagram of a book digitization apparatus 200 according to Embodiment 2 of the disclosure.

The book digitization apparatus 200 has the same configuration as that of the book digitization apparatus 100 except for including an acquisition unit 12 instead of the acquisition unit 2 and further including a peak detection unit 13 (detection unit) as illustrated in FIG. 6. The peak detection unit 13 is connected to the acquisition unit 12. The peak detection unit 13 corresponds to an absorption wavelength detection unit that irradiates a book with an X-ray that is an energy ray and detects the X-ray to thereby detect an absorption wavelength of the energy ray of the paper in the book. Additionally, the acquisition unit 12 also functions as a data writing unit that writes the absorption wavelength of the energy ray, which is detected by the absorption wavelength detection unit, in the table 1 in association with information of the paper in the book.

FIG. 7 is a flowchart of the book digitization apparatus 200 creating three-dimensional data of the book.

In a case where the paper type is not known or a case where the X-ray absorption wavelength corresponding to the paper type is not known, the acquisition unit 12 instructs the peak detection unit 13 to detect the X-ray peak absorption wavelength of the paper in the book (step S31). The instruction may be an instruction that is performed by an input to the input unit 3 by a user, or may be an instruction that is automatically output from the acquisition unit 12 to the peak detection unit 13 when data about the wavelength of the X-ray, which is to be acquired from the table 1, is not able to be acquired.

Next, the peak detection unit 13 causes X-rays having various wavelengths to be radiated from the X-ray radiation device 5 and causes the detector 6 to detect the X-rays (step S32). For example, the wavelengths of the X-rays to be radiated onto the book are set to be gradually reduced from 100 nm to 1 pm (0.001 nm) and then absorption intensity thereof detected by the detector 6 is confirmed. The wavelength of the X-ray that is radiated for detecting a peak may be determined in advance, or may be determined each time in accordance with a detection result. The radiation of the X-rays having different wavelengths is able to be performed by a known method. The radiation of the X-rays having different wavelengths is able to be performed by, for example, adjusting an output of the X-ray radiation device 5, interposing an optical filter that transmits an X-ray having a desired wavelength, or using a plurality of X-ray radiation devices that radiate X-rays having different wavelengths.

Next, the peak detection unit 13 determines an X-ray peak absorption wavelength of the paper in the book (step S33). The peak absorption wavelength of the paper may be a peak itself in absorption intensity of the X-ray in the detection result or may be a range of a specific absorbance including the detected peak absorption wavelength. The specific absorbance is, for example, an absorbance equal to or more than an absorbance at which sufficient contrast relative to the ink is obtained.

Even in a case where a type of paper is not known, when an X-ray absorption wavelength corresponding to the paper is stored in the table 1, the peak detection unit 13 determines the peak absorption wavelength of the X-ray to be radiated onto the book from data of peak absorption wavelengths that are stored in the table 1. In this case, the peak detection unit 13 compares the detection result of the X-ray by the detector 6 and the X-ray peak absorption wavelength in the table 1. For example, in a case where the absorption intensity is maximum near 0.020 nm, the peak detection unit 13 determines that the paper in the book is a print sheet (recycled paper), and in a case where the absorption wavelength is maximum near 0.013 nm, the peak detection unit 13 determines that the paper in the book is a newspaper. The peak detection unit 13 outputs the determined peak absorption wavelength to the acquisition unit 12.

The acquisition unit 12 causes the X-ray radiation device 5 to irradiate the book with the X-ray having the wavelength that is determined by the peak detection unit 13 and causes the detector 6 to detect the X-ray (step S13). As a result, the acquisition unit 12 acquires the three-dimensional data described above. Moreover, the acquisition unit 12 writes the X-ray peak absorption wavelength, which is determined by the peak detection unit 13, in the table 1 in association with information (for example, date and time of detection, a sample number, or the like) of the paper (step S34). Such data written in the table 1 is used, as data that is stored in the table 1 in advance, to determine an X-ray peak absorption wavelength as described above when a book including paper of the same type is subsequently converted into digitized data. Accordingly, the time taken to convert the book including the paper of the same type into digitized data is able to be reduced from next time.

In a case where the paper type is not known as described above, data of peak absorption is written in the table 1 for learning, and the table 1 is updated at any time. This makes it possible to enhance accuracy of the table 1.

Note that, determination of the X-ray absorption wavelength corresponding to paper whose type is not known has been described in the present embodiment. The present embodiment is not limited thereto and the X-ray tube voltage corresponding to paper whose type is not known may be determined.

Modified Example

A book may be constituted by a medium and ink attached thereto. For example, the book may have multiple pages or a form of a scroll. Additionally, the book may be a printed matter of one sheet, or a printed matter in which a plurality of sheets are not bound but overlapped. In the X-ray radiation device 5, a state of the book when an X-ray is radiated is not limited and may be a closed state as described above or an opened state.

The X-ray may be another energy ray as long as absorption intensity thereof has sufficient contrast between ink and paper (medium). Examples of the energy ray other than the X-ray include an ultraviolet ray and visible light.

The paper is able to be appropriately determined as long as the energy ray is able to be transmitted and absorption intensity of the energy ray has a sufficient difference from that of the ink. An example of the medium other than the paper includes a resin sheet.

An input of the paper type to the input unit may not be an input from a user. For example, information of the paper type, which is provided to the input unit from a paper analyzing device capable of communicating with the input unit, may be input.

As long as a type of paper and a tube voltage or an absorption wavelength of an energy ray which the paper absorbs are able to be stored in association with each other prior to radiation of the energy ray to the book, the table 1 may not always store such data. For example, the table 1 may be a table that acquires correspondence data of the type of the paper and the tube voltage or the peak absorption wavelength of the X-ray thereof by communication upon input of the paper type and stores the correspondence data. Alternatively, for example, the table 1 may be a table that stores correspondence data corresponding to information of an attribute of the paper and provided by communication upon an input of the information of the attribute of the paper, such as an input of a color or a manufacturer of the paper.

The wavelength of the energy ray to be radiated onto the book is able to be appropriately determined as long as sufficient contrast between the ink and the paper is obtained. For example, the wavelength of the energy ray to be radiated onto the book may be a wavelength in which sufficiently high contrast between the ink and the paper is obtained (for example, in which the contrast is maximum).

Information of the paper that is written in the table 1 in Embodiment 2 is able to be appropriately determined as long as correspondence between the information of the paper and the information of the tube voltage or the wavelength of the X-ray, which are written in the table 1, is clear. The information of the paper is, for example, information of the paper when the correspondence between the type of the paper and the tube voltage or the peak absorption wavelength of the X-ray corresponding thereto is not known. As described above, the information of the paper, which is written in the table 1, may be information, such as date and time of measurement, which is automatically determined or may be information (for example, information of a type of paper, a publication including the paper, or the like) input through the input unit 3 by the user.

[Implementation Example by Software]

A control block 30 (the table 1, the acquisition unit 2, 12, the position designation unit 7, the surface specification unit 8, the data generation unit 9, and the peak detection unit 13) of the book digitization apparatus 100, 200 may be implemented by hardware or may be implemented by software. An example of the hardware includes a logic circuit formed by an integrated circuit (IC chip) or the like. The table 1, the acquisition unit 2, 12, the position designation unit 7, the surface specification unit 8, the data generation unit 9, and the peak detection unit 13 in the book digitization apparatus 100, 200 may be controlled so as to perform the aforementioned function by a control unit that is separately provided.

In a case where the table 1 and the like are implemented by software, the book digitization apparatus 100 includes a computer that executes a command of a program that is software with which each function is realized. The computer includes, for example, at least one processor (control unit) and at least one computer-readable recording medium storing the program. Then, in the computer, the processor reads the program from the recording medium for execution, so that the disclosure is provided.

As the processor, a central processing unit (CPU) is able to be used, for example. As the recording medium, "non-transitory tangible medium", for example, such as a tape, a disc, a card, a semiconductor memory, or a programmable logic circuit besides a read only memory (ROM) or the like is able to be used. Moreover, a random access memory (RAM) or the like that develops the program may be further included.

The program may be supplied to the computer through any transmission medium (a communication network, a broadcast wave, or the like) capable of transmitting the program.

An aspect of the disclosure is able to be provided in a form of a data signal in which the program is embodied with electronic transmission and which is embedded in a carrier wave.

[Conclusion]

A book digitization apparatus 100 according to an aspect 1 of the disclosure includes: a table 1 capable of storing a type of paper and a physical property of an energy ray, which the paper is able to absorb, in association with each other; an acquisition unit 2 that acquires, from the table 1, a physical property of an energy ray, which corresponds to a type of paper that is input; and an image capturing unit (the acquisition unit 2, an X-ray radiation device 5, and a detector 6) that acquires three-dimensional data of a book by capturing an image of the book with an energy ray having the acquired physical property.

According to the aforementioned configuration, the physical property of the energy ray to be radiated is read out from the table 1 upon an input of the paper type. Thereby, it is possible to greatly reduce the time taken to determine the physical property of the energy ray to be radiated onto the paper that accounts for most of the three-dimensional data. Thus, the conversion of the book into digitized data is able to be performed in a reduced time.

The book digitization apparatus 100 according to an aspect 2 of the disclosure may further include a detection unit (peak detection unit 13) that irradiates the book with an energy ray and detects the energy ray to detect a physical property of the energy ray, which the paper in the book absorbs, in the aspect 1.

According to the aforementioned configuration, it is possible to detect the physical property of the paper when correspondence between the paper type and an unknown physical property of an X-ray is not known and to further perform conversion of the book, in which one or both of the paper type and the physical property of the X-ray corresponding thereto is not known, into digitized data.

The book digitization apparatus 100 according to an aspect 3 of the disclosure may further include a data writing unit (acquisition unit 12) that writes, in the table 1, the physical property of the energy ray, which is detected by the detection unit, in association with information about the paper in the book, in the aspect 2.

According to the aforementioned configuration, a combination of an unknown paper type and the physical property of the X-ray corresponding thereto is applied to subsequent conversion of the book including the paper into digitized data. Accordingly, it is possible to reduce the time taken for the subsequent conversion of the book, in which the paper type or the physical property is not known, into digitized data.

The book digitization apparatus 100 according to an aspect 4 of the disclosure may further include a data creating unit 20 (a position designation unit 7, a surface specification unit 8, and a data generation unit 9) that creates two-dimensional data of the book from the three-dimensional data of the book, in any one of the aspects 1 to 3.

According to the aforementioned configuration, it is possible to create digitized data (page data in a case where the book has multiple pages) indicating a content of the book.

In the book digitization apparatus 100 according to an aspect 5 of the disclosure, the energy ray may be an X-ray, in any one of the aspects 1 to 4.

According to the aforementioned configuration, it is possible to convert a general book using paper as a medium into digitized data.

In the book digitization apparatus 100 according to an aspect 6 of the disclosure, the physical property may be a wavelength of the energy ray, and the wavelength may be a peak absorption wavelength in which an absorbance at which the energy ray is absorbed by the paper is highest, in any one of the aspects 1 to 5.

According to the aforementioned configuration, it is possible to capture an image of a paper part most clearly with the X-ray.

A book digitization method according to an aspect 7 of the disclosure includes: acquiring a physical property of an energy ray from a table, the physical property corresponding to a type of paper that is input, the energy ray being an energy ray which the paper is able to absorb, the table being capable of storing a type of paper and a physical property of an energy ray in the paper in association with each other; and acquiring three-dimensional data of a book by capturing an image of the book with an energy ray having the acquired physical property.

According to the aforementioned configuration, an effect similar to that of the aspect 1 is exerted.

[Additional Matter]

The disclosure is not limited to each of embodiments described above and may be modified in various manner within the scope of the claims, and an embodiment achieved by appropriately combining techniques disclosed in different embodiments is also encompassed in the technical scope of the disclosure. Further, by combining the techniques disclosed in each of different embodiments, a new technical feature may be formed.

The present disclosure contains subject matter related to that disclosed in Japanese Priority Patent Application JP 2018-119948 filed in the Japan Patent Office on Jun. 25, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A book digitization apparatus comprising:
a table capable of storing a type of paper and a physical property of an energy ray, which the paper is able to absorb, in association with each other;
an energy ray radiation device that irradiates a book in a closed state with the energy ray having the physical property acquired from the table, the physical property corresponding to the type of paper that is input; and
a detector that acquires three-dimensional data of the book by detecting the energy ray transmitted through the book.

2. The book digitization apparatus according to claim 1, further comprising:
a wavelength determination unit that determines a peak absorption wavelength of the energy ray to be radiated onto the book from a peak absorption wavelength as the physical property stored in the table,
the energy ray radiation device irradiating the book with the energy ray having the peak absorption wavelength,
the detector detecting the energy ray with which the book is irradiated to detect the physical property of the energy ray, which the paper in the book absorbs.

3. The book digitization apparatus according to claim 2, further comprising a data writing unit that writes, in the table, the physical property of the energy ray, which is determined by the wavelength determination unit, in association with information about the paper in the book.

4. The book digitization apparatus according to claim 1, further comprising:
a position designation unit that designates, in three-dimensional data of the book, a linear path so that the linear path passes through at least one sheet of overlapping paper and designates, as an initial point for determining a page region, a point which corresponds to a threshold for distinguishing a data value of a sheet and a data value of a gap in the path;
a surface specification unit that specifies a position of the page region that is determined in accordance with the initial point; and
a data generation unit that maps data values of respective points of the page region to a two-dimensional plane, thereby generating two-dimensional data.

5. The book digitization apparatus according to claim 1, wherein the energy ray is an X-ray.

6. The book digitization apparatus according to claim 1, wherein
the physical property is a wavelength of the energy ray, and
the wavelength is a peak absorption wavelength in which an absorbance at which the energy ray is absorbed by the paper is highest.

7. A book digitization method comprising:
acquiring a physical property of an energy ray from a table, the physical property corresponding to a type of paper that is input, the energy ray being an energy ray which the paper is able to absorb, the table being capable of storing a type of paper and a physical property of an energy ray in the paper in association with each other;
irradiating a book in a closed state with an energy ray having the physical property acquired from the table, the physical property corresponding to the type of paper that is input; and
acquiring three-dimensional data of the book by detecting the energy ray transmitted through the book.

* * * * *